United States Patent [19]

Brault et al.

[11] Patent Number: 5,238,409
[45] Date of Patent: Aug. 24, 1993

[54] VALVE MEANS FOR TRAINING MANIKIN

[75] Inventors: Richard A. Brault; Dianne B. Croteau, both of Toronto, Canada

[73] Assignee: Actar Airforce Inc., Toronto, Canada

[21] Appl. No.: 988,845

[22] Filed: Dec. 10, 1992

[30] Foreign Application Priority Data

Apr. 6, 1992 [CA] Canada .................................. 2065184

[51] Int. Cl.5 .................................................. G09B 23/32
[52] U.S. Cl. .................................... 434/265; 434/267; 434/270
[58] Field of Search ................. 434/265, 267, 270; 251/349

[56] References Cited

U.S. PATENT DOCUMENTS

| | | | |
|---|---|---|---|
| 2,904,898 | 9/1959 | Marsden | 434/265 |
| 3,009,266 | 11/1961 | Brook | 434/265 |
| 3,068,590 | 12/1962 | Padellford | 434/265 |
| 3,199,225 | 8/1965 | Robertson et al. | 434/265 |
| 3,859,737 | 1/1975 | Laerdal | 434/265 |
| 3,874,093 | 4/1975 | Garbe | 434/265 |
| 4,194,303 | 3/1980 | Heller | |
| 4,619,617 | 10/1986 | Rice | 434/265 |
| 4,984,987 | 1/1991 | Brault et al. | 434/265 |

FOREIGN PATENT DOCUMENTS

| | | |
|---|---|---|
| 79795 | 5/1983 | European Pat. Off. . |
| 306328 | 8/1989 | European Pat. Off. . |
| 3049583 | 7/1982 | Fed. Rep. of Germany ...... 434/265 |
| 1207372 | 11/1958 | France . |
| 2117250 | 10/1983 | United Kingdom . |

Primary Examiner—Cary E. O'Connor
Assistant Examiner—L. Thomas
Attorney, Agent, or Firm—R. Gale Rhodes, Jr.

[57] ABSTRACT

A valve means (1) is disclosed for use in a teaching manikin to simulate an open and closed airway of the human throat. The valve means comprises a section with a hollow passage and two end openings. A first opening fits onto a manikin head and a second opening seats on a sealing surface. When the head is tilted back the valve means (1) lifts to open the second end to permit the flow of air.

7 Claims, 4 Drawing Sheets

VALVE MEANS FOR TRAINING MANIKIN

TECHNICAL FIELD

This invention relates to manikins intended to be used for teaching artificial resuscitation and/or cardio-pulmonary resuscitation (CPR) techniques. In particular, it relates to an valve means adapted to resist the flow of air through a throat of the manikin unless the head of the manikin is tilted back to open the airway.

BACKGROUND ART

There are many complex and interrelated functions and structures of the human body that are pertinent to the application of both ventilation and cardiac massage resuscitation techniques and, accordingly to the construction of practice or teaching manikins. One of the features that is sought to be obtained in a such a manikin is a means to simulate head tilting for throat or airway clearance.

The Applicant is the assignee of all interest in European Patent Application Publication #0 306 328, which describes a manikin having a disposable lung bag connected to a hollow head. This manikin was developed for practicing mouth to mouth resuscitation techniques.

The applicant is also aware of U.S. Pat. Nos. 2,904,898, 3,199,225 and 3,068,590; French patent 1,207,372 and Australian Patent 270,640 relating to other resuscitation training apparatus.

In U.S. Pat. No. 4,984,987 the applicants disclosed an inexpensive, readily portable manikin to serve as a teaching tool for a basic CPR instruction course. The manikin comprised in combination a head means, a chest means, a disposable lung means, and a compression means in which;

the head means has an opening to receive air blown into it by a user, the chest means is adapted to be removably connected to the head means, the disposable lung means is adapted to be removably connected to the head means within the chest means, in communication with the opening of the head means, the compression means is adapted to fit within the chest means to receive compression administered by a user.

The head means of this manikin was said to be a hollow head which will avail itself to mass production techniques. The head has a mouth and nostril openings for artificial resuscitation. The head has a neck portion which is adapted to be connected to a disposable lung bag to receive the air blown into the head. The neck was also adapted to connect into a opening in the chest means. The chest means was a simple shell to provide a visual impression of a torso with anatomical indicators or reference points to assist one to locate the correct position for hand placement during application of the compression heart massage techniques. The front and back portions of the chest were said to be separated by a resilient compression means.

Other manikins described in the literature known to the Applicant are:

U.S. Pat. No. 4,194,303—primarily directed to a manikin for teaching abdominal thrust techniques to expel throat lodged food particles, U.K. Patent Application #2 117 250 A—directed to a manikin in which air is expelled from a ball by compression of the manikin's chest and a pneumatic circuit is provided to measure the force of the compression, German patent DE 30 49 583 A1—directed to a complex manikin circuit with a pair of bellows.

European Patent Application #0 079 795 A2—which relates to a pneumatic lung analog.

The valve means of this invention is adapted to be an improvement for the manikin disclosed in U.S. Pat. No. 4,984,987 and European Patent Application Publication #0 306 328. It will be appreciated, however, that the valve means of this invention could be used as an element in other training manikins. The invention provides the advantage of a simple, low cost valve that effectively permits teaching of head tilt to open the airway of the throat of a victim.

DISCLOSURE OF THE INVENTION

The invention is an valve means for a throat opening that will open and close in response to tilting the head of the manikin. The valve means comprises a hollow section which leads from a throat opening of a manikin to a sealing surface. When the head is tilted back the valve means breaks contact with the sealing surface and permits the flow of air through the hollow section. The sealing surface may be a surface of another element, such as, a floor or an adjacent part of the manikin.

BRIEF DESCRIPTION OF THE DRAWINGS

In the figures that illustrate the preferred embodiment of this invention.

MODES FOR CARRYING OUT INVENTION

In the figures that illustrate the preferred embodiment of this invention, like numerals indicate like elements.

Figure 1:
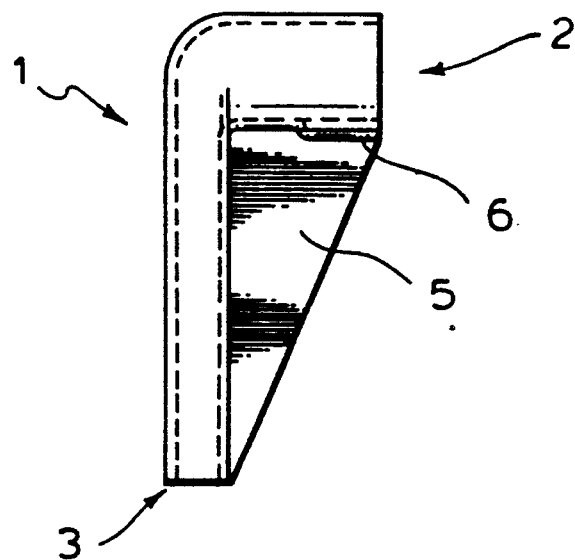
FIG. 1 is a side view of the valve means of this invention.
Figure 2:
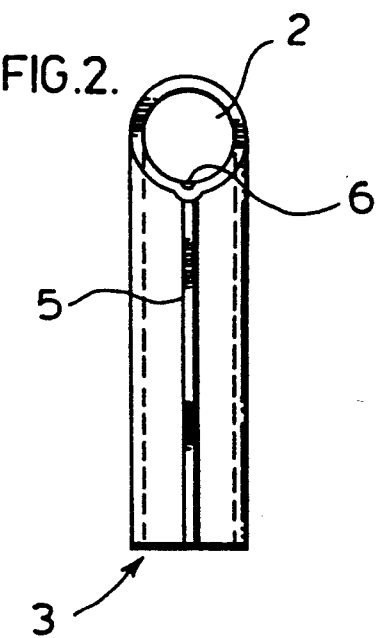
FIG. 2 is an end view of the valve means of this invention.

The preferred embodiment of the valve means of this invention is illustrated in FIGS. 1 and 2. As illustrated, the valve means (1) is a hollow section or tube that is bent at approximately right angles. A first end (2) and a second end (3) are open to communicate with the inside of the valve means (1). A reinforcing flange (5) is provided to strengthen the valve (1) against bending. A keyway (6) is provided to ensure that the valve means is attached to the throat means (13) in the correct position. The corresponding key on the throat (13) is not shown.

Figure 3:
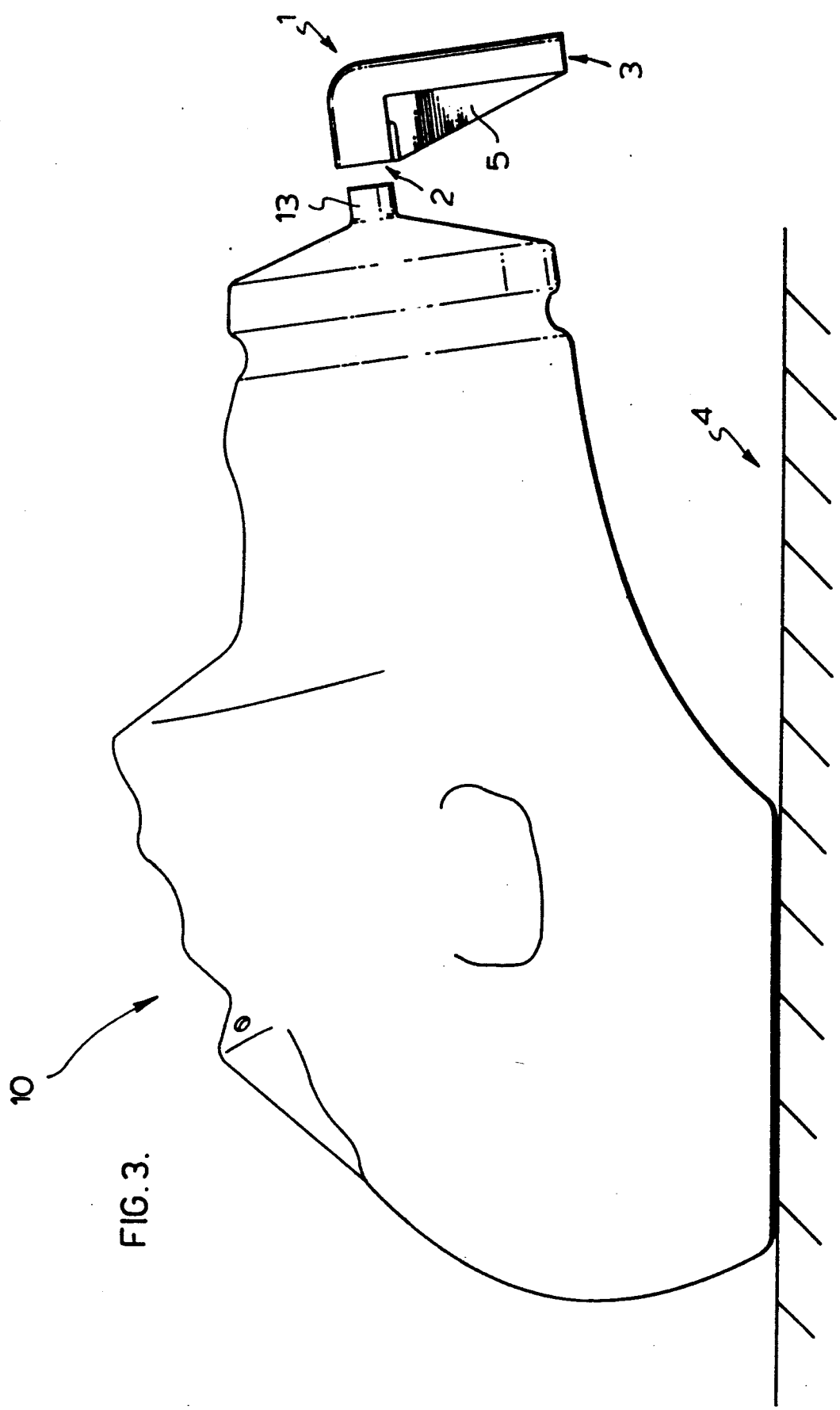
FIG. 3 is a side view of a head connected to the valve means of this invention.

As illustrated in FIG. 3, a first end (2) of the valve means may be adapted to fit onto the head (10) of a manikin to extend from a throat opening (13). A second end (3) of the valve means is adapted to seat against a surface (4) to impede the flow of air through the valve means when the head is lying face up in a relaxed position (not shown in FIG. 3). The valve means is bent to an appropriate angle to effect seating against the selected surface. The head (10) may be tilted counter clockwise as shown in the FIG. 3 to lift the second end (3) from the surface (4) to allow air to blow out of the second end (3).

Figure 4:
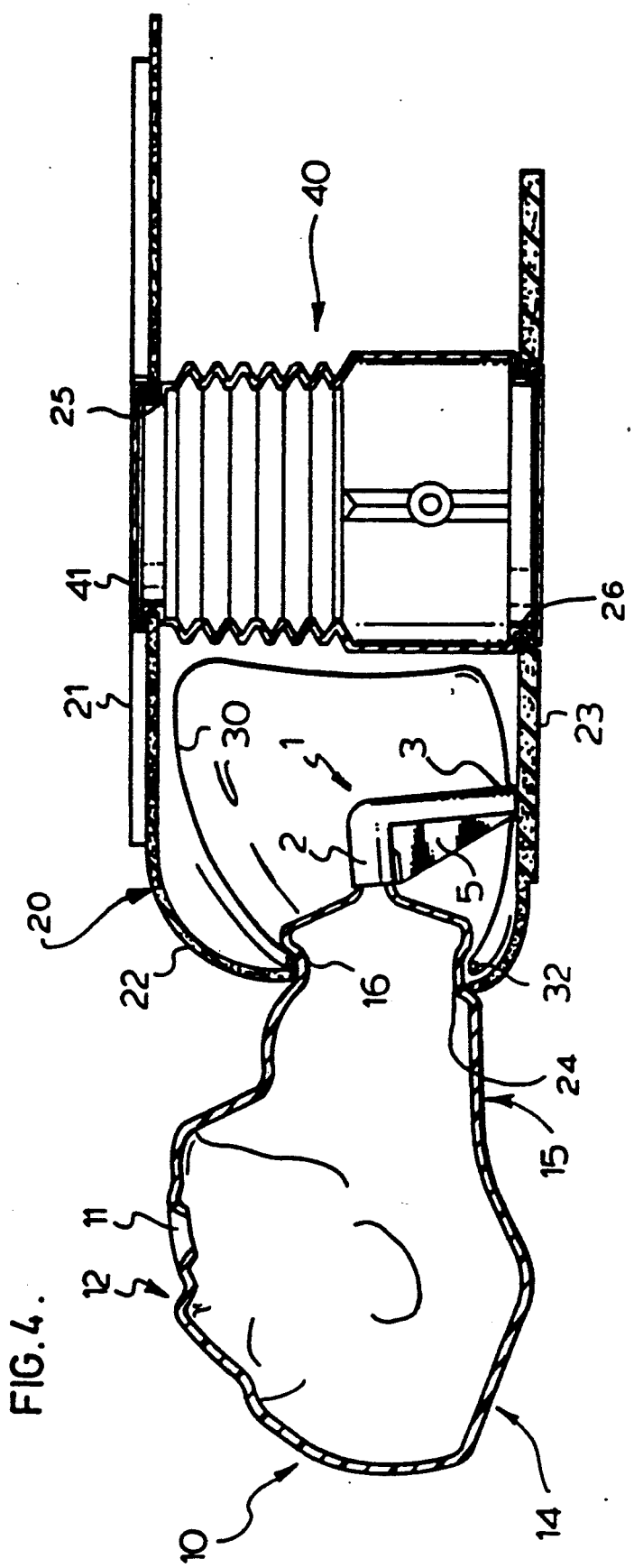
FIG. 4 is a side sectional view illustrating the present invention in a CPR manikin.
Figure 5:
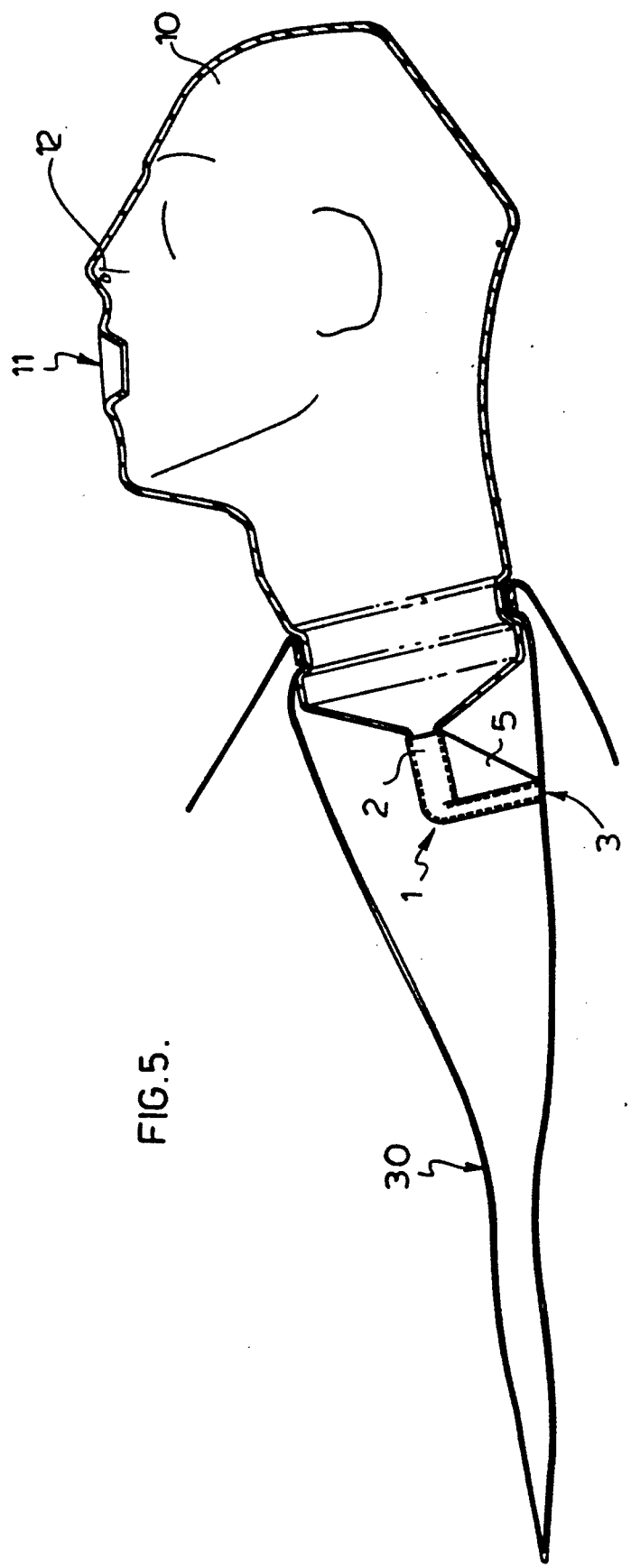
FIG. 5 is a side view of a resuscitation manikin having the valve means of this invention.

The arrangement of the components of a CPR manikin having the valve means of this invention may be used is illustrated in FIG. 4. A head means (10) is a blow moulded hollow plastic shell which has general approximations of the shape and features of a human head. Openings are provided for the mouth (11), the nostrils (12) and the throat (13). The back portion of the head has a seat (14) which is flattened so that it will lie flat against the floor when the head is tilted back to provide an indicator for the procedure used for opening the victim's throat. The head has a neck (15) in which there is a fitting groove (16).

A chest plate (20) is an integral cross-linked polyethylene closed cell foam sheet die cut in the general shape of a chest (21), shoulders (22) and a back (23). The chest cavity is formed by bending the chest plate (20) over upon itself so that the back plate (23) lies against the floor and the front plate (21) overlies it. A neck opening (24) is cut centrally in the shoulder portion (22). A front opening (25) and a rear opening (26) are provided to fit about a compression piston (40). The compression piston (40) secures and separates the chest (21) and the back (23).

A disposable lung is provided in the form of a plastic bag (30). An elastic band (32) [not shown in FIG. 1—see FIG. 2] is looped about the bag (30) at a location appropriate to the volume of the lung capacity of the imaginary victim. The bag (30) is marked with dotted lines (not shown) or the like for location of the elastic band (32) to simulate the lung volumes of different types of possible victims.

The valve means (1) of this invention is shown friction fit over to the throat (13) and the lung bag (30) is assembled over it and the throat.

In operation the head (10) is ordinarily in a horizontal position and the second end of the valve means (1) is sealed against the inside surface of the plastic bag (30). The bag (30) rests on the inside surface of the back plate (23) which rests on a floor or other supporting surface. The head means (10) may be tilted back to lift the valve means (1) to unseal the second end (3). Ventilation drills may be practiced by pinching the nose and blowing air into the mouth (11) (see FIG. 3). The air enters the head (10) and expels air through throat (13) and the valve means (1) into bag (30) to fill the chest cavity and press the front plate (21) upward to visually indicate the lung expansion. When blowing stops air expels from bag (30) into the head (10) and through the mouth (11). The drill may then be repeated. External heart massage practice may be done by using the lower rib indicator to locate the correct hand position (which is also the location of the plate (41) of the piston), then compression heart massage techniques may be practiced using the piston.

INDUSTRIAL APPLICABILITY

The invention provides a valve means suitable for use in a practice manikin to facilitate the teaching of mouth to mouth resuscitation techniques.

What is claimed is:

1. In a resuscitation manikin having a head and a throat opening, a valve means (1) comprising a section with a hollow interior passage having
   a first end opening (2) adapted to be connected to said throat opening (13) of the manikin and
   a second end opening (3) adapted, in a first position, to rest on a surface (4) to impede the flow of air through the passage and, in a second position, to lift from the surface to permit the flow of air through the passage; said first position being obtained when said head (10) of the manikin is faceup and said second position being obtained when the head is tilted back.

2. The valve means of claim 1 in which the section depends from a throat opening to seat the second end on a surface below the throat opening.

3. The valve means of claim 2 in which the section extends from the throat opening for a short distance and then extends downward towards the surface.

4. The valve of claims 1, 2 or 3 where the surface is an interior surface of a lung bag (30).

5. The valve of claims 1, 2 or 3 where the surface is an interior surface of a lung bag (30) and the lung bag rests on a surface supporting the manikin.

6. The valve of claims 1, 2 or 3 where the surface is an interior surface of a lung bag (30) and the lung bag rests on a part of the manikin.

7. The valve means of claims 1, 2 or 3 in which the first end is keyed to the throat of the manikin to permit attachment in one angular position.

* * * * *